US008625781B2

(12) United States Patent (10) Patent No.: US 8,625,781 B2
Lubberhuizen (45) Date of Patent: Jan. 7, 2014

(54) ENCRYPTON PROCESSOR

(75) Inventor: Wessel Harm Lubberhuizen, Delden (NL)

(73) Assignee: Greenpeak Technologies B.V. (NL)

( * ) Notice: Subject to any disclaimer, the term of this patent is extended or adjusted under 35 U.S.C. 154(b) by 810 days.

(21) Appl. No.: 12/677,096

(22) PCT Filed: Sep. 7, 2007

(86) PCT No.: PCT/NL2007/050441
§ 371 (c)(1),
(2), (4) Date: Mar. 24, 2010

(87) PCT Pub. No.: WO2009/031883
PCT Pub. Date: Mar. 12, 2009

(65) Prior Publication Data
US 2010/0322411 A1 Dec. 23, 2010

(51) Int. Cl.
*H04K 1/00* (2006.01)
(52) U.S. Cl.
USPC ............... 380/28; 380/44; 713/187; 713/189
(58) Field of Classification Search
None
See application file for complete search history.

(56) References Cited

U.S. PATENT DOCUMENTS 7,099,470 B2 * 8/2006 Lim ................................ 380/29
2007/0083586 A1 4/2007 Luo et al.

OTHER PUBLICATIONS

Hamalainen, P., et al., "Design and Implementation of Low-Area and Low-Power AES Encryption Hardware Core," I Proceedings of the 9th EUROMICRO Conference of Digital System Design: Architectures, Methods and Tools, Cavtat/l Dubrovnik, Croatia, Aug. 28-Sep. 1, 2006, pp. 577-583. [.*
Krishnamoorthy, A., et al., "Minimize IC Power Without Sacrificing Performance," D&R Headlines News, Jul. 15, 2004.*
International Search Report, in connection with International Application No. PCT/NL20071050441, mailed Jun. 17, 2008, 3 pages.
Jarvinen, T., et al., "Efficient Byte Permutation Realizations for Compact AES Implementations," Proceedings of the European Signal Processing Conference, Sep. 4-8, 2005, Antalya, Turkey, pp. 1-4.
Krishnamoorthy, A., et al., "Minimize IC Power Without Sacrificing Performance," D&R Headlines News, Jul. 15, 2004, http://www.us.design-reuse.com/news/?id=8288&print=yes, Retrieved May 28, 2008, 10 pages.
Hamalainen, P., et al., "Design and Implementation of Low-Area and Low-Power AES Encryption Hardware Core," Proceedings of the 9th EUROMICRO Conference of Digital System Design: Architectures, Methods and Tools, Cavtat/ Dubrovnik, Croatia, Aug. 28-Sep. 1, 2006, pp. 577-583.

(Continued)

*Primary Examiner* — Shewaye Gelagay
(74) *Attorney, Agent, or Firm* — Fliesler Meyer LLP (57) ABSTRACT

An Encryption processor is disclosed comprising an S-box unit, a byte permutation unit, a MixColumns unit and a key expansion unit. In an embodiment the byte permutation unit comprises a data input terminal for receiving input data, two or more row processors, each row processor having an input coupled to the input terminal and an output, and a clock gating circuit for generating for each of the two or more row processors a gated clock signal. Furthermore, a clock gated key expansion unit is disclosed. By clock gating, the power consumption of the processor is reduced which extends the battery life time in battery powered devices.

12 Claims, 8 Drawing Sheets

(56) References Cited

OTHER PUBLICATIONS

Author Unknown, Advance Encryption Standards (AES), National Institute of Standards and Technology (NIST), Apr. 2003, pp. 168-169.

Oswald, et al., European Network of Excellence in Cryptology (ECRYPT), D.VAM.2, State of the Art in Hardware Architectures, Sep. 5, 2005, 46 pages.

Author Unknown, Federal Information Processing Standards Publication 197, Advanced Encryption Standard (AES), Nov. 26, 2001, 51 pages.

* cited by examiner

ENCRYPTON PROCESSOR

FIELD OF THE INVENTION

The present invention relates to an Encryption processor comprising an S-box unit, a byte permutation unit, a MixColumns unit and a key expansion unit.

The invention has particular application AES processor for use in a wireless infrastructure employing wireless communication devices by means of a smart wireless protocol, wherein end nodes are battery powered. ZigBee is an example of such smart wireless protocols.

BACKGROUND OF THE INVENTION

Because the application of AES (Advanced Encryption Standard) is fully in development for various (wireless) applications, there is growing likeliness of future usage by others. In particular, IEEE 802.15.4 has defined several AES based security provisions for different levels of protection and with various key-sizes and various secondary encryption additions.

For low cost systems that are battery powered or use energy harvesting, a low (peak) power and an area efficient security implementation are very important.

Figure 1:
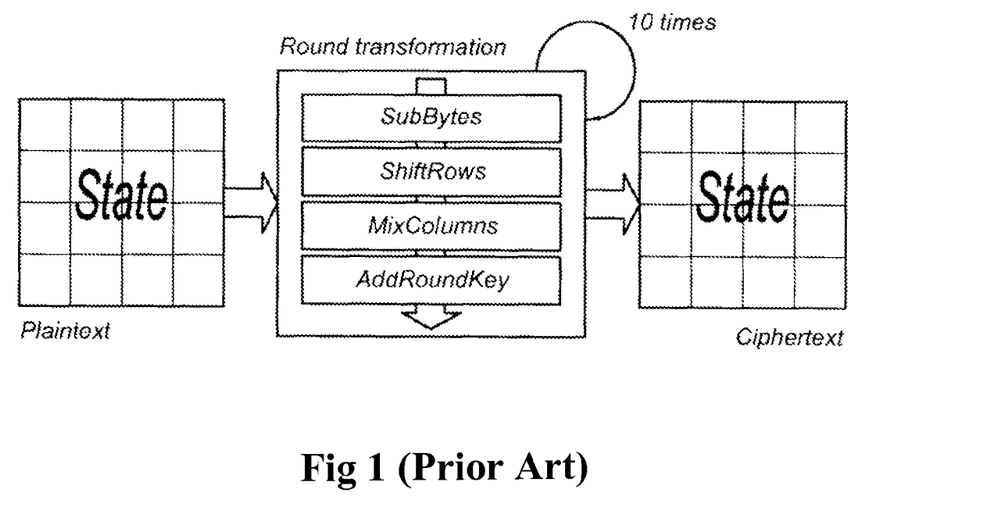
FIG. 1 shows the AES iteration process with successive transformation round.
Figure 2:
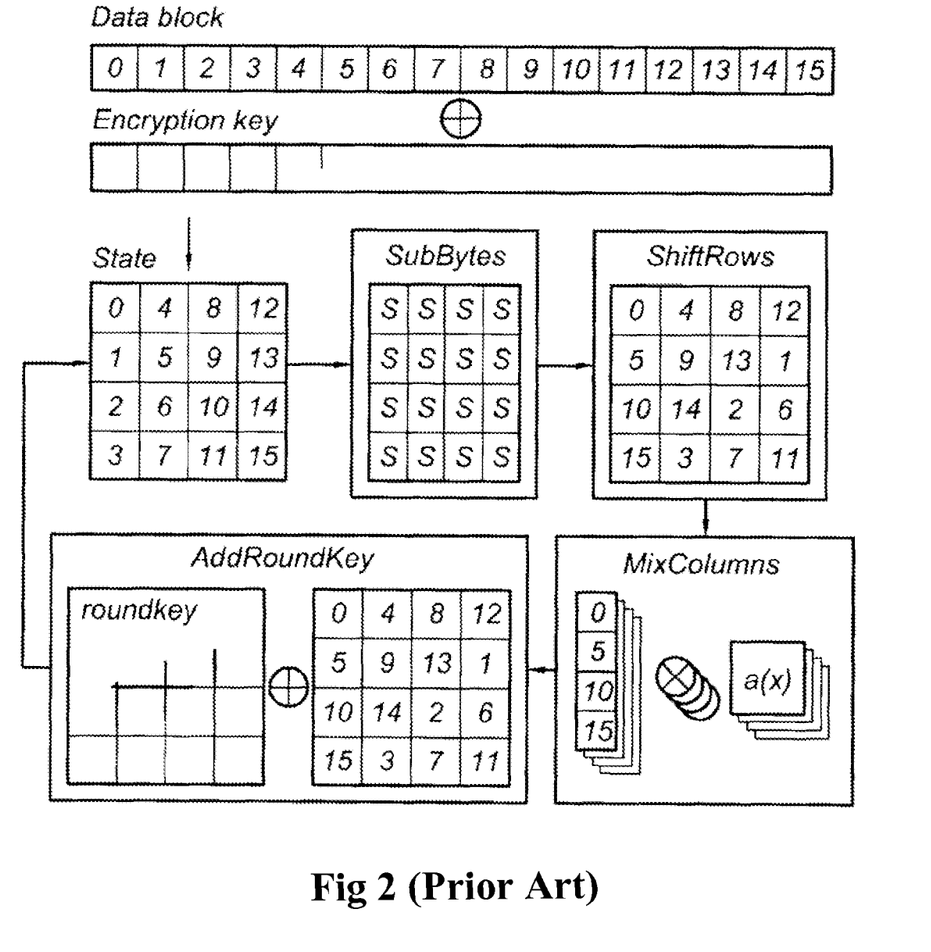
FIG. 2 shows the AES iteration process with successive transformation round in more detail.

Ref [1] specifies the algorithm for AES encryption. AES is a symmetric block cipher, which means that the plain text is found by de-encrypting the cipher text with the same key. FIG. 1 illustrates the basic transformation steps of the AES defined algorithm: SubBytes, ShiftRows, MixColumns, AddRoundKey. FIG. 2 shows the 4 steps in more detail. They are all linear transformations, except for the SubBytes operation, which is non-linear. The order of the SubBytes and the ShiftRows transformations can be exchanged, because the SubBytes operation performs a mapping of byte values, keeping the order in tact, while the ShiftRows operation changes the order of the bytes, keeping the values in tact. With AES-128 a 128 bit key is used and the cycle of the 4 steps is made 10 rounds, but other key sizes of 192 and 256 are also possible with more rounds.

Many different architectures for the best performance with respect to throughput, energy consumption and chip area have been investigated. Architectures with the highest throughput and largest area use a data path width of 128 bits, and employ an unrolling of the round operations. Architectures that are optimised for the smallest area use a data path width of 8 bits, and perform the rounds consecutively. In 8-bit designs, the most area and energy is used by the register that holds the state and key variables. Some designs have employed a single port memory to allow storage of the state variable, and others use specially designed register structures that combine storage of state variable with the ShiftRows transformation (byte permutation units). Ref [5] gives an overview of memory and register based byte permutation units.

Figure 3:
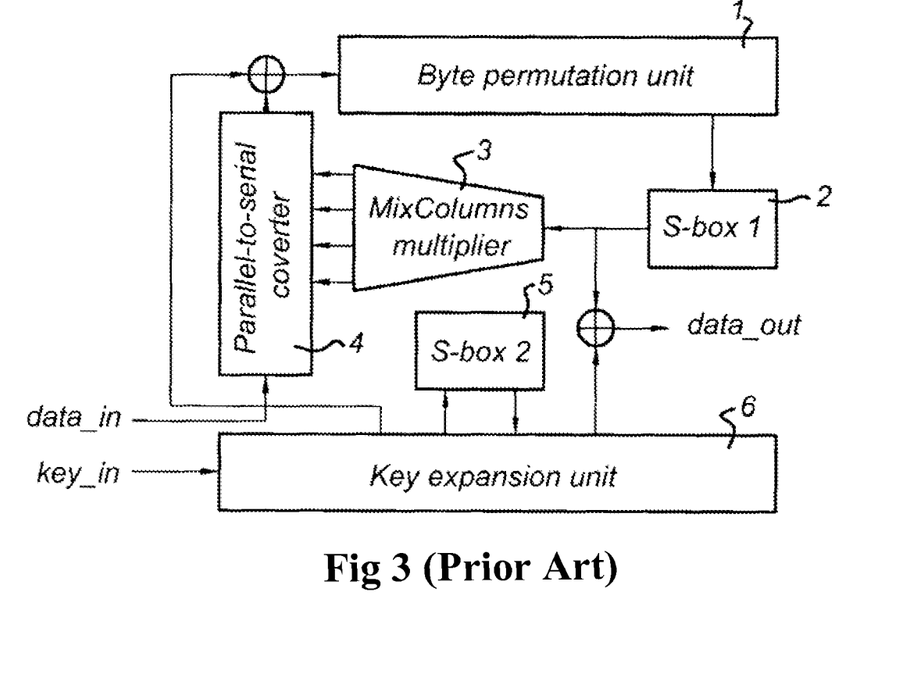
FIG. 3 shows a high level architecture of a prior art AES core.
Figure 4:
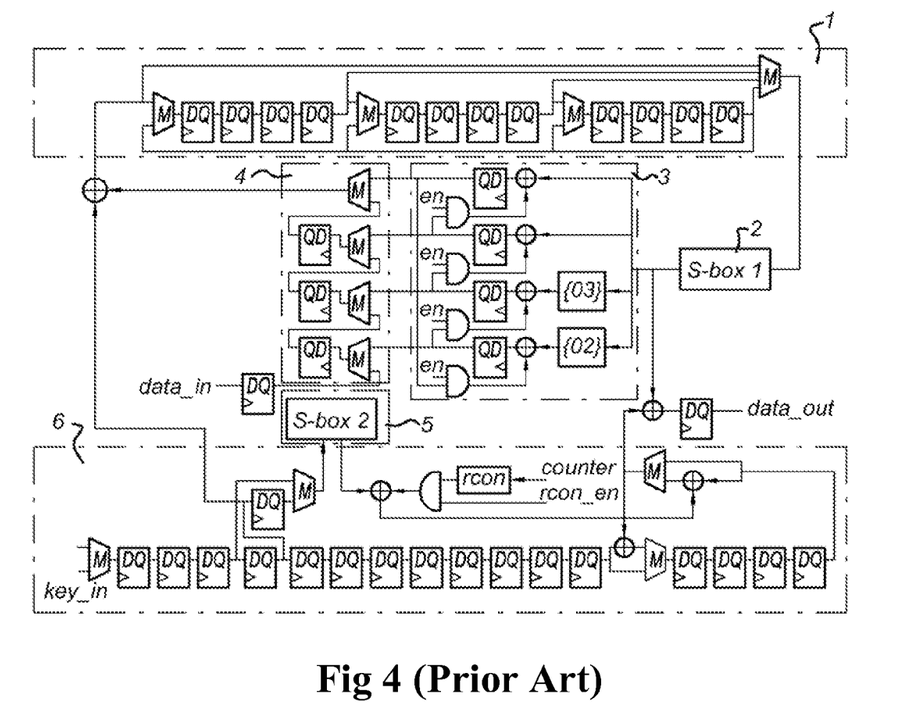
FIG. 4 shows a data flow diagram of the prior art AES core shown in FIG. 3.

FIG. 3 shows a high level architecture for an AES core. The high level architecture is disclosed in Ref [3]. FIG. 4 shows a detailed flow diagram for the AES core shown in FIG. 3. The AES core comprises a byte permutation unit 1, a first S-box 2, a MixColumns multiplier 3, a parallel-to-serial converter 4, a second S-box 5 and a key expansion unit 6. The AES core is an 8-bits AES core. All signal lines shown in FIGS. 3 and 4 corresponds to 8-bits wide lines and each delay, multiplexer, demultiplexer, XOR (logical exclusive OR operation) etc., are elements which process the 8-bits input signal signals to obtain 8-bits output signals. The AES core shown in FIG. 4 will be used as a reference AES core to elucidate the advantages of the embodiment of the present invention.

DEFINITIONS

"Bit" is a binary digit having a value of 0 or 1.

"Byte" is a group of eight bits that is treated either as a single entity or as an array of 8 individual bytes.

"Cipher" is a series of transformations that converts plaintext to ciphertext using a cipher key.

"Cipher Key" is a secret, cryptographic key that is used by a Key Expansion routine to generate a set of Round Keys; it can be pictured as a rectangular array of bytes having four rows and four columns.

"Ciphertext" is data output from the Cipher or input to an Inverse Cipher.

"Inverse Cipher" is a series of transformations that convert ciphertext to plain text using the Cipher Key.

"Key Expansion" is a routine used to generate a series of Round Keys from the Cipher Key.

"Plaintext" is data input to the Cipher or output from the inverse cipher.

"Round Key" are values derived from the Cipher Key using the key expansion routine and are applied to the State in the Cipher and Inverse Cipher.

"State" is an Intermediate Cipher result that can be pictured as a rectangular array of bytes, having four rows and four columns.

"S-box" a non-linear substitution table used in several byte substitution transformations and in the Key expansion routine to perform a one for one substitution of a byte value.

"Word" is a group of 32 bits that is treated either as a single entity or as an array of 4-bytes.

"AddRoundKey" is a transformation in the Cipher and Inverse Cipher in which a Round Key is added to the State using an XOR operation. The length of a Round Key equals the size of the State, i.e. 16 bytes.

"MixColumns" is a transformation in the Cipher that takes all of the columns of the State and mixes their data (independently of one other) to produce new columns.

"ShiftRows" is a transformation in the Cipher that processes the State by cyclically shifting the last three rows of the State by different offsets.

"SubBytes" is a transformation in the Cipher that processes the State using a non-linear byte substitution table (S-box) that operates on each of the State bytes independently.

XOR is Exclusive-OR operation.

$\oplus$ is Exclusive-OR operation.

· indicates a finite field multiplication.

In the polynomial representation, multiplication in $GF(2^8)$ (denoted by ·) corresponds with the multiplication of polynomials modulo an irreducible polynomial of degree 8. A polynomial is irreducible if its only divisors are one and itself. For the AES algorithm, the irreducible polynomial is $m(x)=x^8+x^4+x^3+x+1$ or {01} {1b} in hexadecimal notation.

SUMMARY OF THE INVENTION

The present invention seeks to provide an improved Encryption processor, especially for energy efficient encryption of data, using the AES-128 encryption standard.

The Encryption processor according to the invention has a byte permutation unit comprising:

a data input terminal for receiving input data;

two or more row processors, each row processor having an input coupled to the input terminal and an output;

a clock gating circuit for generating for each of the two or more row processors a gated clock signal.

The object of the invention is achieved by reducing the number of active registers or delays and logic circuitry coupled to the outputs of the registers. This is done by using clock gating circuitry. As a result of the clock gating, the average activity factor of the registers is reduced to 29% compared to the situation that no clock gating was applied. In the prior design shown in FIG. 4, all registers of the circuitry performing the same function are continuously active during processing. Synthesis results show that the area of the prior art circuitry is comparable but uses 60% more power.

In an exemplary embodiment of the invention, the byte permutation unit comprises four row processors, and the clock gating circuit is arranged for generating for each of the four row processors a different gated clock signal. It has been found that using four row processors provides an optimal solution with respect to circuitry area.

In a further embodiment, the byte permutation unit comprises four output terminals and each output of the four row processors being coupled to a corresponding output terminal. This feature allows to provide State columns to the MixColumns unit and to pipeline the processing in the MixColumns unit. The four input signals are considered as a polynomial over $GF(2^8)$. This enables the MixColumns unit to perform very efficiently the polynomial and multiplied modulo $x^4+1$ with a fixed polynomial a(x), given by $$a(x)=\{03\}x^3+\{01\}x^2+\{01\}x+\{02\}.$$

In a further embodiment of the Encryption processor, an output of the S-box unit is coupled to the input terminal of the byte permutation unit, and the four output terminals of the byte permutation unit are coupled to four input terminals of the MixColumns unit, wherein the MixColumns unit comprises:

a rotator unit having four input terminals coupled to the four input terminals of the MixColumns unit and four output terminals, wherein the rotator unit is arranged to receive four bytes at the input terminal at a first frequency, to perform a cyclic shift on the four bytes at a second frequency to supply sequentially four groups of four intermediate bytes to four output terminals of the rotator unit, wherein the second frequency is four times the first frequency, and a mixing unit having four input terminals coupled to the four output terminals of the rotator unit and an output terminal, wherein the mixing unit is arranged to combine the data at the four input terminals (c1, c2, c3, c4) to obtain an output signal corresponding to the equation:

$$out=(\{02\}\cdot c1)\oplus(\{03\}\oplus c2)\oplus c3\oplus c4$$

wherein $\cdot$ is a multiplication in $GF(2^8)$ and $\oplus$ is a XOR operation, c1, c2, c3 and c4 are the input signals at the respective four input terminals and out is the output signal at the output terminal. These features allow the Encryption processor to generate in one clock cycle the output signal corresponding to the equation from the input signals.

In a further exemplary embodiment of the invention, the mixing unit comprises circuitry arranged to perform with one fixed constant coefficient multiplier unit a multiplication in the AES Galois Field of input signal c1 with the coefficient {02} and input signal c2 with the coefficient {03}. These features allow the Encryption processor to obtain with minimal chip area and delay the result of the equation.

In an exemplary embodiment of the Encryption processor, the key expansion unit comprises:

a processing unit having a first input coupled to an input terminal of the key expansion unit, a first output coupled to an output terminal of the key expansion unit; and a register bank having an input coupled to a second output of the processing unit and an output coupled to a second input of the processing unit, wherein the register bank comprises:

four units having a delay line of three delays, each unit having an input coupled to the input of the register bank, a clock signal input and an output;

demultiplexer having four inputs, an output coupled to the output of the register bank and a control signal input, each input coupled to an output of the four units; and a control unit for alternately supplying an active clock signal to one of the four units and generating a control signal to be supplied to the clock signal input of the demultiplexer. This feature allows to reduce the power consumption further.

In an embodiment of the Encryption processor, the Encryption processor further comprises:

an input key terminal for receiving an input key;

a first XOR unit having a first input coupled to the input terminal of the Encryption processor and a second input coupled to the second input key terminal of the Encryption processor;

a second XOR unit having a first input coupled to the output of the mixing unit, a second input coupled to the output of the output terminal of the key expansion unit;

a first multiplexer having a first input coupled to an output of the first XOR unit and a second input coupled to an output of the second XOR unit and an output coupled to an input of the S-box unit, wherein an output of the S-box unit is coupled to the input terminal of the byte permutation unit. These features allows to use only one S-box in stead of four, i.e. four S-boxes one coupled to each of the four outputs of the byte permutation unit. This reduces the chip area and the power consumption.

In an further embodiment of the invention, the Encryption processor further comprises:

another data input terminal for receiving other input data;

an input multiplexer for multiplexing the input data and other input data to obtain a multiplexed data signal to be supplied to the first input of the first XOR unit;

a second byte permutation unit having an input coupled to the S-box;

a second MixColumns unit coupled to the second byte permutation unit;

an output multiplexer having an input coupled to the output of the MixColumns unit and an input coupled to the output of the second MixColumns unit, to obtain a combined signal to be supplied to the second XOR unit. And in another further embodiment of the invention, the Encryption processor further comprises:

another data input terminal for receiving other input data;

an input multiplexer for multiplexing the input data and other input data to obtain a multiplexed data signal to be supplied to the first input of the first XOR unit;

a second byte permutation unit having an input coupled to the S-box and four outputs;

wherein the MixColumns unit comprises four additional input terminals coupled to the four outputs of the second byte permutation unit, wherein the inputs of the rotator unit are coupled to the four input terminals and four additional input terminals of the MixColumns unit, wherein the rotator unit is arranged to receive alternating the bytes at the four input terminals and the four additional input terminals at the first frequency, to perform a cyclic shift on the combination of the four bytes at the input terminals and additional input terminals at a third frequency to supply sequentially four intermediate bytes to the four outputs of the rotator unit at the third frequency, wherein the third frequency is eight time the first frequency. Security processing often requires multiple blocks to be encrypted using the same key. For example, in CCM (=CTR+CBC MAC) mode encryption requires two AES cycles for each 16 byte block. One for authentication (CBC MAC mode) and one for encryption (CTR). The implementation of the respective operations of the AES algorithm according to the invention allows us to have an interleaved Encryption processor, wherein the hardware of some operations, for example key expansion unit and S-boxes for more than one AES cycle for each respective 16 byte block of plaintext. This reduces both chip area and power consumption.

In an embodiment of the interleaved Encryption processor, the Encryption processor further comprises a clock gating circuit for generating for the byte permutation unit and the second byte permutation unit a first and second gated clock signal respectively. This feature enables to have only one byte permutation unit active at a time. This reduces the power consumption.

In all embodiments given above, the reduction of the power consumption makes the invention suitable for use in wireless and battery powered devices. The reduction extends the battery life time and consequently the maintenance costs for systems comprising such wireless and battery powered devices.

BRIEF DESCRIPTION OF THE DRAWINGS

The present invention will be discussed in more detail below, using a number of exemplary embodiments, with reference to the attached drawings, in which.

DETAILED DESCRIPTION OF EXEMPLARY EMBODIMENTS

Figure 8:
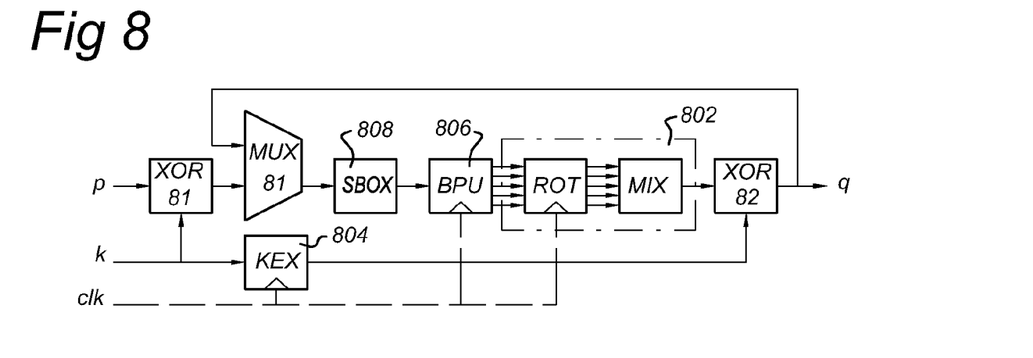
FIG. 8 shows a data flow diagram of an AES encryption core according to the invention.

The present invention relates to two architecture aspects. The first architecture aspect relates to an AES encryption core performing one AES encryption cycle on a 16 byte plaintext block with an encryption key. FIG. 8 shows the architecture of such an architecture. The second architecture aspect relates to an AES encryption core suitable for performing one AES encryption cycle on two or more 16 byte plaintext blocks using one encryption key. Both architectures improve the efficiency with respect to chip area and power consumption further and will be described below in more detail.

Figure 5:
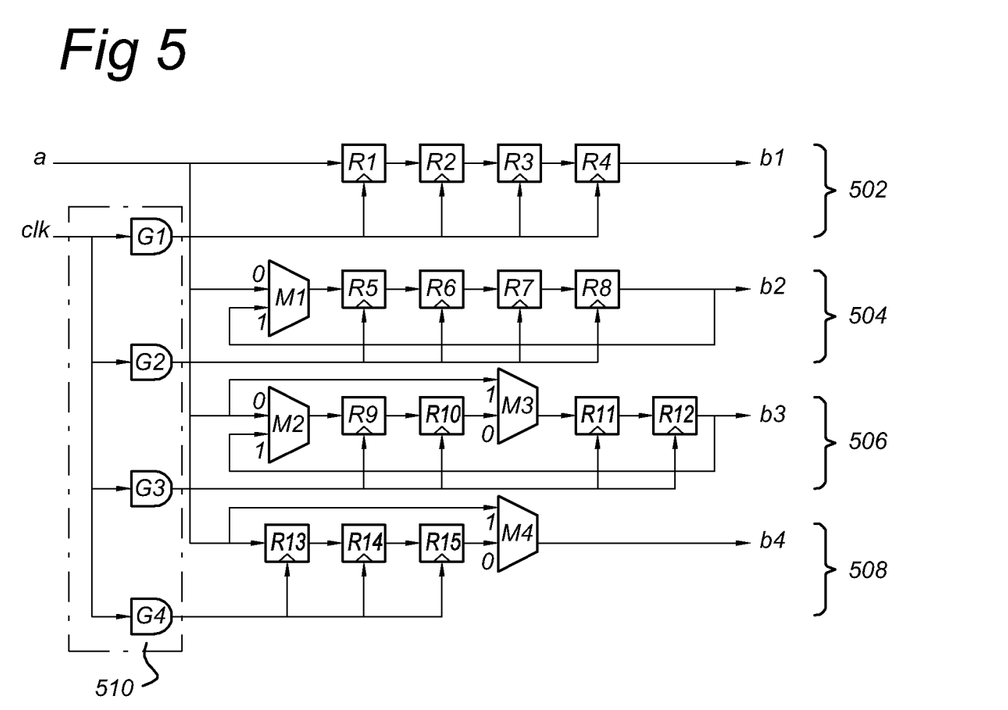
FIG. 5 shows a data flow diagram of a byte permutation unit according to the invention.

FIG. 5 shows a data flow diagram of a byte permutation unit (BPU) according to the invention. The byte permutation unit is designed to implement the 'ShiftRows' transformation as specified by [1] in section 5.1.2. This operation reorders the 16-byte state variable (four row and four columns) by cyclically shifting the last three rows of the state by different offsets. The signal lines in the data flow diagram represent 8 bit signals representing one byte. The operations in the flow diagram are performed on 8 bit signals.

The BPU according to the invention comprises a single data input port of 8 bits a and four output ports of 8 bits b1, b2, b3, b4. The BPU comprises further four separate row processing units 502, 504, 506, 508. The data input port a is arranged for receiving input data. The input data are blocks of plaintext data comprising 16 bytes of data. The first row processor unit 502 is implemented as a shift register with 4 delay elements R1-R4. The input of delay element R1 is coupled to the input of the BPU and the output of delay element R4 is coupled to the output port b1 of the BPU. The second row processor unit 504 is implemented as a shift register with 4 delay elements R5-R8 and a multiplexer M1. A first input of the multiplexer M1 is coupled to the input a of the byte processing unit. The output of the multiplexer M1 is coupled to the input of delay element R5 and a second input of the multiplexer M1 is coupled to the output of delay element R8. The output of delay element R8 is coupled to the output port b2 of the BPU. The third row processor unit 506 comprises a shift register with 4 delay elements R9-R12 and two multiplexers M2 and M3. A first input of the two multiplexers is coupled to the input a of the BPU. The second input of multiplexer M2 is coupled to the output of delay element R12 and the output of multiplexer M2 is coupled to the input of delay element R9. The second input of multiplexer M3 is coupled to the output of delay element R10 and the output of multiplexer M3 is coupled to the input of delay element R11. The output of delay element R12 is coupled to the output port b3 of the BPU. The fourth row processor 508 comprises a shift register of three delay elements R13-R15 and a multiplexer M4. A first input of the multiplexer M4 is coupled to the input port a of the BPU and a second input of the multiplexer M4 is coupled to the output of delay element R15. The output of the multiplexer is coupled to the output port b4 of the BPU. The BPU comprises further a clock gating circuit 510 for generating for each of the row processors a gated clock signal. The clock gates G1-G4 could be implemented by a logical AND function, wherein the gated clock signal corresponds the signal obtained by performing a logical AND function on the clock signal clk and a control signal. Other implementations are commonly known to the person skilled in the art. By means of the clock gating function the number of active register of delay elements is reduced which reduces the power consumption.

The control signals for the multiplexers M1-M4 and the clock gates G1-G4 are generated by a central control unit (not shown). The values for the control signals show a periodic pattern that is repeated every 16 clock cycles. Table 1 shows the values of the respective control signals during the 16 clock cycles.

TABLE 1

Control signals for the byte permutation unit.

| | Time | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| | Row | | | | | | | | | | | | | | | |
| | 0 | 1 | 2 | 3 | 0 | 1 | 2 | 3 | 0 | 1 | 2 | 3 | 0 | 1 | 2 | 3 |
| | Column | | | | | | | | | | | | | | | |
| | 0 | 0 | 0 | 0 | 1 | 1 | 1 | 1 | 2 | 2 | 2 | 2 | 3 | 3 | 3 | 3 |
| M1 | X | 0 | X | X | X | 0 | X | X | X | 0 | X | X | X | 0 | 1 | X |
| M2 | X | X | 0 | X | X | X | 0 | X | X | X | 0 | X | 1 | 1 | 1 | X |
| M3 | X | X | 0 | X | X | X | 0 | X | X | X | 0 | X | 0 | 0 | 1 | X |
| M4 | X | X | X | 0 | X | X | X | 0 | X | X | X | 0 | X | X | X | 1 |
| G1 | 1 | 0 | 0 | 0 | 1 | 0 | 0 | 0 | 1 | 0 | 0 | 0 | 1 | 0 | 0 | 0 |
| G2 | 0 | 1 | 0 | 0 | 0 | 1 | 0 | 0 | 0 | 1 | 0 | 0 | 0 | 1 | 1 | 0 |
| G3 | 0 | 0 | 1 | 0 | 0 | 0 | 1 | 0 | 0 | 0 | 1 | 0 | 1 | 1 | 0 | 0 |
| G4 | 0 | 0 | 0 | 1 | 0 | 0 | 0 | 1 | 0 | 0 | 0 | 1 | 0 | 0 | 0 | 0 |

In table 1, it can be seen that the control signal for the multiplexers M1-M4 can have three different values, namely '1', '0' and 'X'. Under control of a value '0' or '1', the multiplexer will supply the signal at the input port indicated with a '0' or '1' respectively to the output of the multiplexer. A value 'X' represents a don't care signal, i.e. the value could be either a '0' or a '1'. As the delay elements coupled to a multiplexer do not have an active clock signal, any value could be supplied to the multiplexer. The 'X' value in table 1 enables to reduce the complexity to the control unit and consequently the chip area.

During a period of 16 clock cycles, the input data is written consecutively to the input port a (traversing rows first, columns next). When columns 0, 1 and 2 are processed, only one row processor is activated at any time using the clock gates G1-G4. Then, the other row processors are not used and therefore the energy consumption is reduced. When column 3 is processed, one additional shift operation is performed by row processor 2 during the third byte, and two additional shift operations are performed by row processor 3 during the first two bytes. The registers of row processor 4 stay unchanged and are kept in low power mode for the entire column. As a result of the clock gating, the average activity factor of the registers is reduced to 18/64=28.1%.

In total, the BPU according to the invention uses 15 delay elements R1-R15, 4 multiplexers M1-M4 and some clock gating circuitry 510. A recent prior art implementation of the ShiftRows operation is illustrated in FIG. 4, contour 1. In the prior art implementation, the BPU has 4 multiplexers and 12 shift registers. The AES design based on that implementation features a parallel-to-serial-converter (FIG. 4, contour 4), which is not required for an AES architecture based on the present invention. For the purpose of comparing the prior art implementation with the first embodiment of the present invention, we combine the resources of the BPU (FIG. 4, contour 1) and the parallel-to-serial converter (FIG. 4, contour 4). In total, the prior art implementation requires 15 registers and 8 multiplexers. All registers are continually active during processing. Synthesis result shows that the prior art implementation uses 57% more area and 149% more power compared to the embodiment of the BPU according to the invention.

It should be noted that a power reduction can also be obtained by having two, three, five or more row processors. However, in that case a less optimal solution will be found with respect to the combination chip area and power consumption. Furthermore, having four output ports b1-b4 has an advantage when the four output signals are supplied simultaneously to a MixColumns unit 802 of the AES processor. Each fourth clock cycle the four signals b1-b4 of the four output ports correspond to a column of 4 bytes of the state being output of the ShiftRows transformation.

Figure 6:
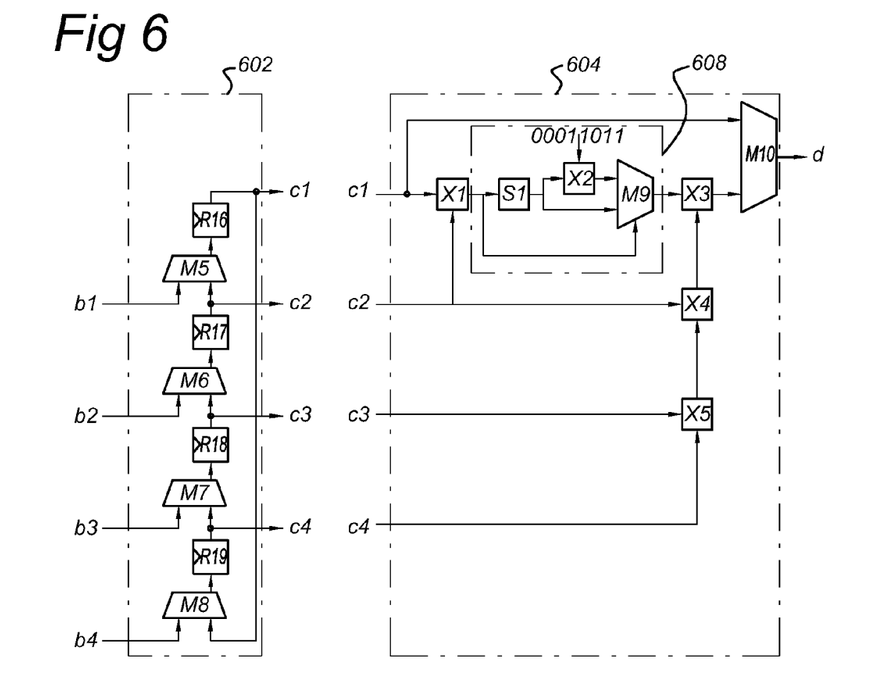
FIG. 6 shows a data flow diagram of a MixColumns unit according to the invention.

FIG. 6 shows a data flow diagram of a MixColumns unit 802 according to the invention. The MixColumns unit 802 comprises two part. The first part is a rotator unit 602 and the second part is a mixing unit 604. The MixColumns unit 802 according to the invention is a pipelined column mixer to execute the 'MixColumns' transformation as specified by [1]. The rotator unit 602 comprises 4 registers (R16-R19) and 4 multiplexers (M5-M8). The mixing unit 604 comprises five XOR units (X1-X5), a shift unit (S1), and two multiplexers (M9-M10).

As said before, each fourth clock cycle, the four output signals b1-b4 of the byte permutation unit represent a column of 4 bytes of the state being the output result of the ShiftRows transformation. An entire column of a state (=4 bytes) is loaded in a single clock cycle from the BPU (with b1-b4 from FIG. 6) into the registers R16-R19.

In the four subsequent cycles, the register values are rotated to perform a cyclic shift on the four bytes. In this way, sequentially four groups of four output bytes are supplied to four output terminals of the rotator unit. Each clock cycle, four bytes c1-c4 are supplied to the mixing unit 604.

The 'MixColumns' transformation operates on the State column-by column, treating each column as a four term polynomial as described in Sec. 4.3 of [1]. The columns are considered as polynomials over $GF(2^8)$ and multiplied modulo $x^4+1$ with a fixed polynomial $a(x)$, given by $$a(x)=\{03\}x^3+\{01\}x^2+\{01\}x+\{02\}.$$

This can be written as a matrix multiplication $s'(x)=a(x)\otimes s(x)$.

Ref [1] teaches that as a result of this matrix multiplication the four bytes b1-b4 in a column are replaced by the following:

$$d_0=(\{02\}\cdot b1)\oplus(\{03\}\cdot b2)\oplus\{01\}b3\oplus\{01\}b4$$

$$d_1=(\{02\}\cdot b2)\oplus(\{03\}\cdot b3)\oplus\{01\}b4\oplus\{01\}b1.$$

$$d_2=(\{02\}\cdot b3)\oplus(\{03\}\cdot b4)\oplus\{01\}b1\oplus\{01\}b2.$$

$$d_3=(\{02\}\cdot b4)\oplus(\{03\}\cdot b1)\oplus\{01\}b2\oplus\{01\}b3.$$

Wherein $d_0$, $d_1$, $d_2$ and $d_3$ form a column of a state outputted by the MixColumns transformation. From the equations above, it can easily be seen that the four values of $d_0$, $d_1$, $d_2$ and $d_3$ can be obtained by cyclic rotation of the values of b1, b2, b3 and b4 and performing the same function of the rotated values. The rotator unit 602 performs the cyclic rotation of the values b1, b2, b3 and b4 and the mixing unit 604 performs the function above and computes output signal d from the register output values corresponding to the signals c1-c4. In this way, the combination of the rotation unit 602 and mixing unit 604 of the MixColumns unit transforms a state column at the output of the ShiftRows transformation into a state column of the MixColumns transformation.

In the mixing unit 604, the signals c1 and c2 are added using XOR unit X1. The result is multiplied by two, using shift unit S1. The output of S1 is XOR-ed using XOR unit X2, with the constant {1b}="0011011". Multiplexer M5 selects the output of XOR unit X2 when the most significant bit of the output of XOR unit X1 has the value '1', otherwise the output of S1 is selected. The selection signal is indicated by the dashed line from the signal line between XOR unit X1 and shift unit S1 to the multiplexer M9. The circuit formed by shift unit S1, XOR unit X2 and multiplexer M5 effectively implements a constant coefficient multiplier in the AES Galois Field with the coefficient {02}.

Subsequently, the values of c2, c3 and c4 are added to the output of M9, using the XOR units X3, X4 and X5 to obtain the output signal d. The circuitry is arranged to perform with one fixed constant coefficient multiplier unit 608, a multiplication in the AES Galois Field of input signal c1 with the coefficient {02} and input signal c2 with the coefficient {03}. The implementation of mixing unit 604 performs the following function:

$$d = (\{02\} \cdot (c1+c2)) \oplus c2 \oplus c3 \oplus c4$$

wherein · is a multiplication in $GF(2^8)$ and $\oplus$ is a XOR operation, c1, c2, c3 and c4 are the input signals at the respective four input terminals and out is the output signal at the output terminal This corresponds, without proof, to the equation:

$$d = (\{02\} \cdot c1) \oplus (\{03\} \cdot c2) \oplus c3 \oplus c4.$$

In the last round of an encryption cycle, the MixColumns operation should not be performed. In that case, multiplexer M10 is used to bypass the mixing network, by selecting signal c1 instead of the output of XOR unit X3.

The embodiment of the byte permutation unit with four outputs and MixColumns unit with four inputs form an optimal combination. Input data rate at the input of the byte permutation unit is similar to the output data rate at the output of the MixColumns unit. This allows to use a clock signal having the same frequency. In this embodiment the SubBytes transformation is preferably performed before the data is supplied to the byte permutation unit. However, the SubBytes transformation can still be applied to the four output signals of the byte permutation unit. In that case four S-box instances have to be developed, which require more circuitry than a non-pipelined S-box before the byte permutation unit.

Table 2 shows the values of the control signals for the multiplexers of the rotator unit and table 3 shows the values of the control signals for multiplexer M10 of the mixing unit 604.

TABLE 2

Control signals for the rotator depicted in FIG. 6a.

| | Time | | | |
|---|---|---|---|---|
| | 0 | 1 | 2 | 3 |
| M5-M8 | 1 | 0 | 0 | 0 |

TABLE 3

Control signals for mixing unit depicted in FIG. 6b.

| | Time | | | | | | |
|---|---|---|---|---|---|---|---|
| | 0 | 1 | ... | 15 | 16 | 17 | ... | 159 |
| M10 | 1 | 1 | ... | 1 | 0 | 0 | ... | 0 |

The resources used by the embodiment are: 4 registers, 6 multiplexers, 5 XOR units and a shift unit (S1). A recent prior art implementation of the MixColumns transformation is illustrated in FIG. 4, contour 3. That implementation uses a 1-byte input, and a 4 byte output that is fed into a parallel to serial converter, and requires 4 registers, 4 XOR units, 4 AND units and two fixed constant multipliers. From [1] section 4.2.1 can be learned that a fixed constant multiplier can be implemented by performing repeated application of the a left shift and a subsequent conditional bitwise XOR with {1b}. To implement the two fixed constant multipliers {02} and {03} at least two left shift units, three XOR units and two multiplexers are required.

Figure 7:
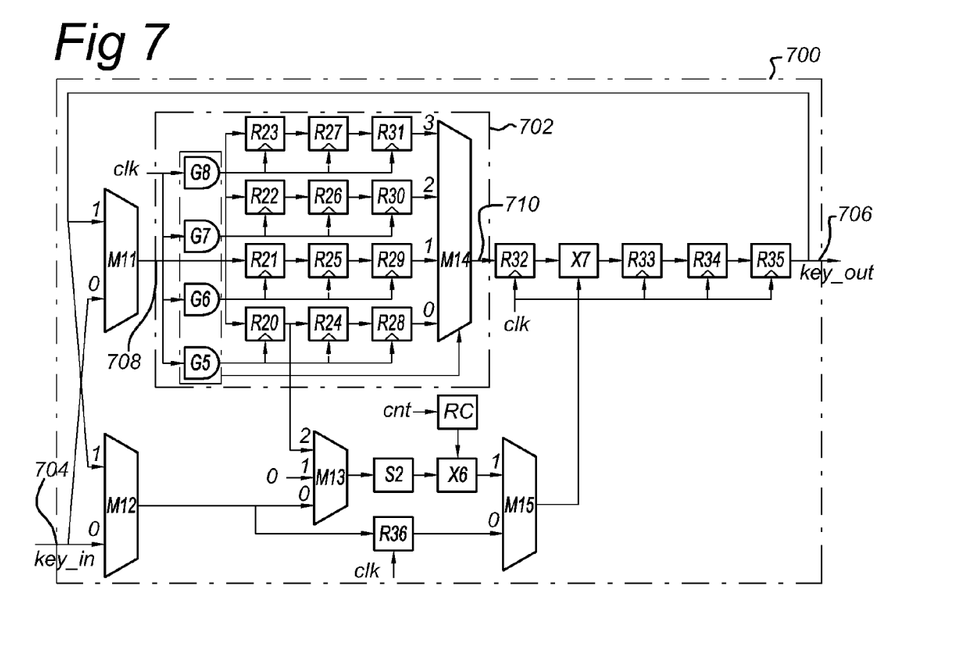
FIG. 7 shows a data flow diagram of a key expansion unit according to the invention.

FIG. 7 shows a data flow diagram of a key expansion unit according to the invention. Similar to the byte permutation unit, clock gating is used to reduce the power consumption. The key expansion unit comprises 17 registers R20-R36, 5 multiplexers M11-M15, 2 XOR units X6-X7, 4 clock gates G5-G8, a Round Constant generator RC, and an S-box S2.

The purpose of the key expansion unit is to implement the key expansion algorithm described in [1], section 5.2. The key expansion algorithm takes an initial set of 16 bytes, to generate a set of 160 bytes. The embodiment of the key expansion unit generates one new byte at every clock cycle, using the values stored in registers R20-R36.

The key expansion unit comprises a processing unit 700 surrounding a register bank 702. The processing unit 700 includes all circuitry not being part of the register bank 702. The processing unit 700 comprises a first input 704 coupled to an input terminal key_in of the key expansion unit and a first output 706 coupled to an output terminal of the key expansion unit. The register bank 702 includes an input 708 coupled to a second output 708 of the processing unit 700 and an output 710 coupled to a second input 710 of the processing unit 700. The register bank comprises four units having a delay line of three delays. Each unit has an input coupled to the input of the register bank 702, a clock signal input and an output. The first unit comprises the registers R20, R24, R28. The second unit comprises the registers R21, R25, R29. The third unit comprises the registers R22, R26, R30 and the fourth unit comprises the registers R23, R27 and R31. A demultiplexer M14 has four inputs, an output coupled to the output 710 of the register bank and a control signal input, each input coupled to an output of the four units. The register bank further comprises a control unit 712 for alternately supplying an active clock signal to one of the four units by means of the clock gates G5-G8 and for generating a control signal to be supplied to the clock signal input of the demultiplexer M14.

The key expansion takes place in 10 rounds of 16 clock cycles. A new key expansion cycle can be started every 160 clock cycles. Because the circuit has a latency of 16 clock cycles, it will output the last 16 bytes of the previous expansion cycle during the first 16 clock cycles of the next expansion cycle.

During the first round, multiplexer M11 selects new key data bytes from the input port key_in. During the subsequent rounds, M11 selects the feedback output from register R35. The output of multiplexer M11 is fed into one of the registers R20-R23. The registers R20-R28 are grouped in four rows of three registers each. Every clock cycle, only one of the rows is activated using the clock gates G5-G8. The output of the active row is selected by multiplexer M14. Together with register R32, these registers form a tapped delay line containing the values of the previous 13 outputs.

In clock cycles 0-11 of each round, multiplexer M15 selects the lower input, which is connected to the output of register R36. During this period, the upper branch formed by multiplexer M13, S-box S2 and XOR unit X6 is silenced, because multiplexer M13 selects the constant input 0 at the input indicated with 1. As a result, two taps with a delay difference of 12 bytes are XOR-ed by XOR unit X7. During clock cycles 12-15 of each round, multiplexer M15 selects the upper input, which is connected to the output of XOR unit X6. During clock cycles 13-14, multiplexer M13 selects the output of multiplexer M12. The result is fed through the S-box S2, and XOR-ed by XOR unit X6 with the output of the round constant generator RC. As a result, two taps with a delay difference of 13 bytes are XOR-ed by XOR unit X7. At clock cycle 15, multiplexer M13 selects the output of R20. As a result, two taps with a delay difference of 9 bytes are XOR-ed by XOR unit X7.

The output of XOR unit X7 is delayed by 3 clock cycles by registers R33-R35. The output of register R35 is used as key_out signal and feed back to the multiplexers M11 and M12. Multiplexer M12 normally selects the output of register R35, except during clock cycles 12-15 of the first round. In this period, multiplexer M12 selects the value of the input port key_in.

Tables 4 shows the values of the clock gating control signals. The clock gating control signals are repeated every four clock cycles.

TABLE 4 clock gating control signals.

| Gate | Time | | | |
|---|---|---|---|---|
| | 0 | 1 | 2 | 3 |
| G5 | 1 | 0 | 0 | 0 |
| G6 | 0 | 1 | 0 | 0 |
| G7 | 0 | 0 | 1 | 0 |
| G8 | 0 | 0 | 0 | 1 |

Table 5 shows the values of the control signals for the multiplexers of the key expansion unit during the first round, i.e. the first 16 clock cycles. The value indicates which input port of the multiplexer will be selected.

TABLE 5

Multiplexer control signals during first round.

| | Time | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| M11 | 0 | 0 | 0 | 0 | 0 | 0 | 0 | 0 | 0 | 0 | 0 | 0 | 0 | 0 | 0 | 0 |
| M12 | 1 | 1 | 1 | 1 | 1 | 1 | 1 | 1 | 1 | 1 | 1 | 1 | 0 | 0 | 0 | 0 |
| M13 | 1 | 1 | 1 | 1 | 1 | 1 | 1 | 1 | 1 | 1 | 1 | 1 | 2 | 2 | 2 | 0 |
| M14 | 0 | 1 | 2 | 3 | 0 | 1 | 2 | 3 | 0 | 1 | 2 | 3 | 0 | 1 | 2 | 3 |
| M15 | 0 | 0 | 0 | 0 | 0 | 0 | 0 | 0 | 0 | 0 | 0 | 1 | 1 | 1 | 1 | 1 |

Table 6 shows the values of the control signals for the multiplexers of the key expansion unit during the subsequent 9 rounds, i.e. the subsequent 9 rounds of 16 clock cycles.

TABLE 6

Multiplexer control signal during subsequent 9 rounds.

| | Time | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| M11 | 1 | 1 | 1 | 1 | 1 | 1 | 1 | 1 | 1 | 1 | 1 | 1 | 1 | 1 | 1 | 1 |
| M12 | 1 | 1 | 1 | 1 | 1 | 1 | 1 | 1 | 1 | 1 | 1 | 1 | 1 | 1 | 1 | 1 |
| M13 | 1 | 1 | 1 | 1 | 1 | 1 | 1 | 1 | 1 | 1 | 1 | 1 | 2 | 2 | 2 | 0 |
| M14 | 0 | 1 | 2 | 3 | 0 | 1 | 2 | 3 | 0 | 1 | 2 | 3 | 0 | 1 | 2 | 3 |
| M15 | 0 | 0 | 0 | 0 | 0 | 0 | 0 | 0 | 0 | 0 | 0 | 1 | 1 | 1 | 1 | 1 |

The embodiment of the key expansion unit in FIG. 5 can be compared to the key expansion unit shown in [4], contour 5 and 6, which uses comparable resources: 17 registers, 4 multiplexers, 3 XOR units, 1 S-box 2 and 1 round constant generator. However, in that implementation, all 17 registers are always active, while for this embodiment only 8 registers are active at any time. Comparison of synthesis results shows that the implementation of the Key expansion unit according to the present invention uses 18% less area and 27% less power compared to the prior art implementation.

FIG. 8 shows the architecture of an AES encryption core according to the invention using the byte permutation unit 806, MixColumns unit 802 and key expansion unit 804 described above. The AES encryption core, comprises two XOR units XOR81 and XOR82, a multiplexer MUX81, an S-box 808, a clock gated byte permutation unit 806, a Mix-Columns unit 802 consisting of a rotator unit ROT and a mixing unit MIX and a Clock Gated Key Expansion unit KEX.

The plaintext p, being a four by four block of 16 bytes, is XOR-ed with the input key k by the XOR81 unit. In the first round of 16 clock cycles, the MUX81 unit selects the output of XOR81. In the subsequent 9 rounds, it selects the signal at the output of XOR82. The output signal of MUX81 is fed through the S-box, into the Byte Permutation Unit 806, which has four parallel outputs. The four parallel outputs are coupled to the MixColumns unit 802. The four signals at the input of the MixColumns unit 802 are fed into the Rotation Unit ROT to obtain four output signals to be supplied to the Mixing Unit MIX. The output signal from the mixing unit XOR-ed with the output of the key expander, and supplied to the output port q.

The architecture does not need additional delay elements to synchronize the respective signals. The key expansion unit 804 has a latency of 16 clock cycles. The XOR units XOR81, XOR 82, multiplexer 81, S-box do not have a latency. The byte permutation unit has a latency of 15 clock cycles and the rotator unit ROT of the MixColumns unit 802 has a latency of one clock cycle. Consequently, the signals at the input of XOR 82 are in phase and the output of the XOR 82 can directly be coupled with the input of the multiplexer MUX 81.

Table 7 provides an overview the performance character of a number of prior art architectures and the AES core shown in FIG. 8. Most of the data has been copied from [3], Table 2.

TABLE 7

Performance characteristic of various AES implementations.

| | Design | Process | Voltage | Area (k gates) | number of cycles | Power (uW/MHz) | Current (uA/MHz) | Energy per block (nJ) |
|---|---|---|---|---|---|---|---|---|
| 1 | Hodjat | 0.18 um | ? | 73.2 | 11 | 291 | ? | 320 |
| 2 | Feldhofer | 0.35 um | 1.5 V | 3.4 | 1032 | 45.0 | 30.0 | 46.4 |
| 3 | Hämäläinen | 0.18 um | 1.6 V | 3.1 | 160 | 54.7 | 34.2 | 8.8 |
| 4 | Hämäläinen | 0.13 um | 1.2 V | 3.2 | 160 | 30.0 | 25.0 | 4.8 |
| 5 | Xanadu Wireless | 0.18 um | 1.6 V | 2.5 | 160 | 31.0 | 19.4 | 5.0 |
| 6 | Xanadu Wireless | 0.13 um | 1.2 V | 2.5 | 160 | 17.0 | 14.2 | 2.7 |

All energy consumption results are based on gate level simulations, except for design 1, which is based on the results of actual power measurements. The energy consumption results for design 3 were obtained for 0.18 um, by using the source code that was downloaded from the author's website. Design 4 is the same as 3, the only difference is the process technology.

Design 5 shows the power and area for the AES core architecture shown n FIG. 8, based on a 0.18 um process, obtained from simulation. The result for design 6 is a prediction for the fourth embodiment on 0.13 um technology, assuming the power ratio between design 5 and 6 is the same as between design 3 and 4.

Security processing often requires multiple blocks to be encrypted using the same key. For example, in CCM (=CTR+ CBC MAC) mode encryption requires two AES cycles for each 16 byte block: one for authentication (CBC MAC mode) and one for encryption (CTR). This is commonly done using one of two methods.

In the first method, a single AES core (such as the one depicted in FIG. 8) is first used in CBC-MAC mode for authentication, and then used in CTR mode for encryption. In order to save processing, the output signal of the key expansion unit can be saved for re-use. However, this requires an additional large are because the key expander output signal is 160 bytes long.

Figure 9:
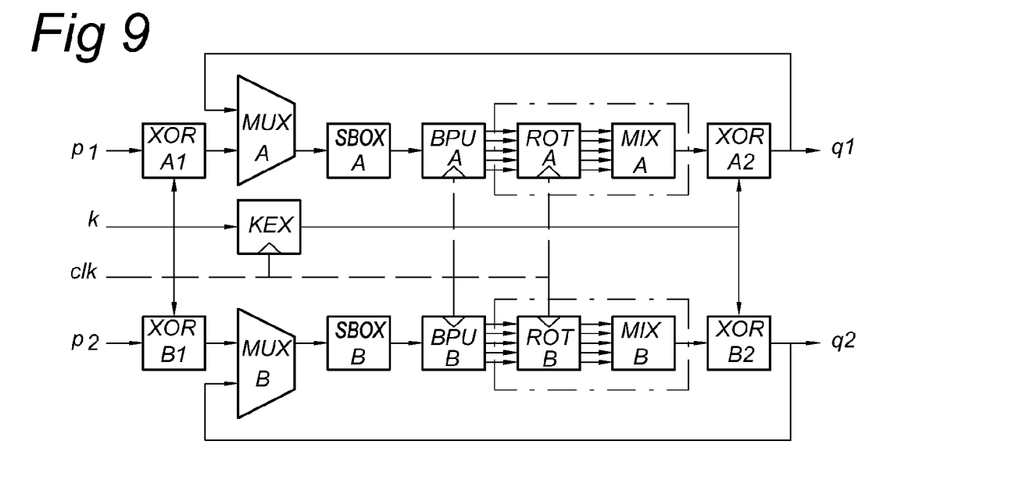
FIG. 9 shows a data flow diagram of a parallel AES architecture.

In the second method, two AES cores are used that run in parallel: one in CTR mode, and one in CBC mode. In this case, one can use a single the key expansion block, saving both power and resources. FIG. 9 shows a data flow diagram of a parallel AES architecture using the AES architecture comprising a byte permutation unit having four parallel outputs according to the invention.

Figure 10:
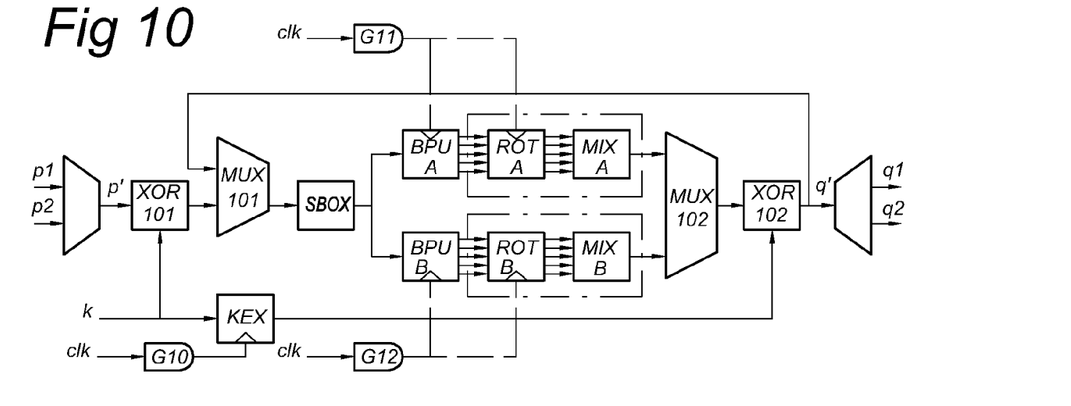
FIG. 10 shows a data flow diagram of a first embodiment of an interleaved AES architecture.

The byte permutation unit, and MixColumns unit according to the invention allows to obtain an interleaving AES core. FIG. 10 shows a data flow diagram or architecture of a first embodiment of an interleaved AES architecture. This AES core comprises a single encryption core that can be used to encrypt two different plain text inputs p1 and p2, with the same key k, into cipher texts q1 and q2. First, the plain texts p1 and p2 (16 bytes each) are multiplexed into a single plaintext p' (32 bytes) using interleaving at the byte level. The resulting plaintext is processed by an encryption core that uses two byte permutation units (BPU A, BPU B), two column rotator units (ROT A, ROT B) and two mixing units (MIX A, MIX B).

At any time, either the upper branch containing the 'A' versions of the units or the lower branch containing the 'B' version is activated, using clock gates G1 and G2. The clock gating pattern is such that the 'A' and 'B' branch are alternately activated. The output of the active branch is selected by the multiplexer MUX 102, XOR-ed with the output of the key expander, and fed back. The key expander is activated only every other clock cycle, using the clock gate G0. After 10 rounds, of 32 clock cycles each, the result is output as the cipher text q', which can be de-interleaved to obtain the cipher texts q1 and q2.

Compared to the parallel AES core in FIG. 9, the interleaving AES core of FIG. 10 will require slightly less area, mainly because it uses only a single S-box. The total energy required for a single encryption cycle will be approximately the same, but the interleaving AES core requires twice as many clock cycles to complete a single encryption cycle. Hence, the energy per clock cycle will be lower for the interleaving AES core, resulting in a lower peak power usage.

Figure 11:
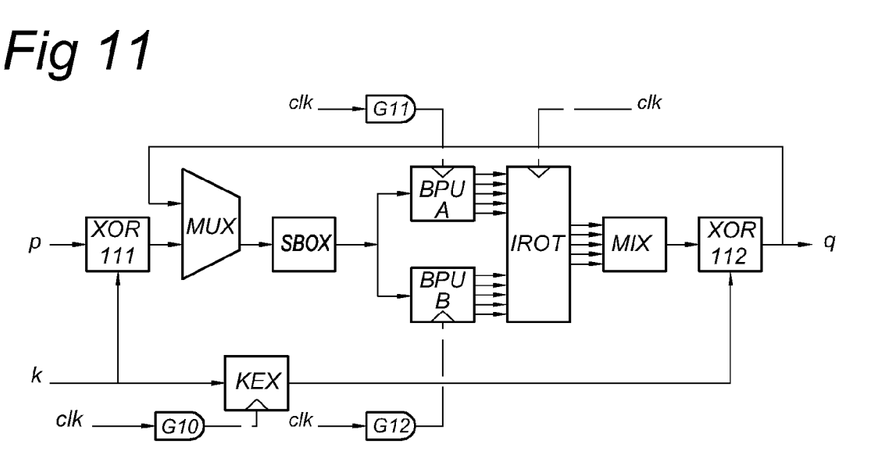
FIG. 11 shows a data flow diagram of a second embodiment of an interleaved AES architecture.
Figure 12:
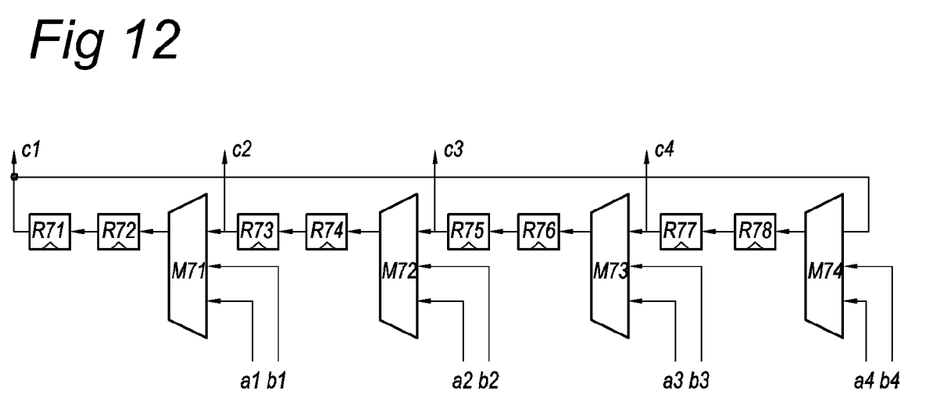
FIG. 12 shows a data flow diagram of an interleaved rotator unit for use in the interleaved AES architecture of FIG. 11.

FIG. 11 shows a data flow diagram of a second embodiment of an interleaved AES architecture. In this embodiment the mixing unit is shared too. An interleaved rotator unit is designed to interleave the output signals of the byte permutation units BPU A and BPU B. FIG. 12 shows a data flow diagram of an interleaved rotator unit for use in the interleaved AES architecture of FIG. 11. The multiplexers M71-M74 select in the first and second clock cycle of 8 clock cycles the signal supplied by the byte permutation units BPU A and BPU B respectively. In the subsequent 6 clock cycles the register values are rotated to perform a cyclic shift.

Several embodiments of the invention have been described above by way of exemplary embodiments. The embodiment are dedicated to the AES encryption standard, but could easily amended to other encryption related algorithms such as block cipher algorithms, hash code generators and random number generators. In general, solutions are provided for using clock gating in encryption processors for use in battery powered devices to reduce the power consumption. Various modifications and variations for the elements described with respect of these embodiments may be made by skilled persons without departing from the scope of the present invention, which is defined by the appended claims.

REFERENCES

[1] National Institute of Standards and Technology (NIST). Advanced Encryption Standard (AES), 2001. FIPS-197.
[2] Oswald, E., State of the Art in Hardware Architectures, IST-2002-507932, ECRYPT, European Network of Excellence in Cryptology, Information Society Technologies D.VAM.2, September 2005, rev. 1., p. 12-13.

[3] Hämaläinen, P. et. al., Design and Implementation of Low-area and Low-power AES Encryption Hardware Core. Proc. of the 9th EUROMICRO Conf. on Digital System Design (DSD'06)
[4] IEEE 802.15.4-2003, Wireless Medium Access control (MAC) and Physical Layer (PHY) Specifications for Low-Rate Wireless Personal Are Networks (LR-WPANs), October 2003, pp. 168-169.
[5] Järvinen, T. et. al., Efficient Byte Permutation Realizations for Compact AES Implementations, 13th European Signal Processing Conference (EUSIPCO 2005), Antalya, Turkey, September, 2005

The invention claimed is:

1. Encryption processor comprising an S-box unit, a byte permutation unit, a MixColumns unit and a key expansion unit, wherein the byte permutation unit comprises:
 a data input terminal for receiving input data;
 two or more row processors, each row processor having an input coupled to the input terminal and an output;
 a clock gating circuit for generating for each of the two or more row processors a gated clock signal:
 wherein the byte permutation unit comprises four row processors, and the clock gating circuit is arranged for generating for each of the four row processors a different gated clock signal;
 wherein the byte permutation unit comprises four output terminals and each output of the four row processors being coupled to a corresponding output terminal; and
 wherein an output of the S-box unit is coupled to the input terminal of the byte permutation unit, and the four output terminals of the byte permutation unit are coupled to four input terminals of the MixColumns unit, wherein the MixColumns unit comprises:
 a rotator unit having four input terminals coupled to the four input terminals of the MixColumns unit and four output terminals, wherein the rotator unit is arranged to receive four bytes at the input terminal at a first frequency, to perform a cyclic shift on the four bytes at a second frequency to supply sequentially four groups of four intermediate bytes to four output terminals of the rotator unit, wherein the second frequency is four times the first frequency, and
 a mixing unit having four input terminals coupled to the four output terminals of the rotator unit and an output terminal, wherein the mixing unit is arranged to combine the data at the four input terminals (c1, c2, c3, c4) to obtain an output signal corresponding to the equation:

$$out=(\{02\}\cdot c1)\oplus(\{03\}\cdot c2)\oplus c3\oplus c4;$$

wherein $\cdot$ is a multiplication in $GF(2^8)$ and $\oplus$ is a XOR operation, c1, c2, c3 and c4 are the input signals at the respective four input terminals and out is the output signal at the output terminal.

2. The Encryption processor according to claim 1, wherein the mixing unit comprises circuitry arranged to perform with one fixed constant coefficient multiplier unit a multiplication in the AES Galois Field of input signal c1 with the coefficient {02} and input signal c2 with the coefficient {03}.

3. The Encryption processor according to claim 2, further comprising a key expansion unit, wherein the key expansion unit comprises:
 a processing unit 700 having a first input coupled to an input terminal of the key expansion unit, a first output coupled to an output terminal of the key expansion unit; and a register bank 702 having an input coupled to a second output of the processing unit and an output coupled to a second input of the processing unit, wherein the register bank comprises:
 four units having a delay line of three delays, each unit having an input coupled to the input of the register bank, a clock signal input and an output;
 demultiplexer having four inputs, an output coupled to the output of the register bank and a control signal input, each input coupled to an output of the four units; and
 a control unit 712 for alternately supplying an active clock signal to one of the four units and generating a control signal to be supplied to the clock signal input of the demultiplexer.

4. The Encryption processor according to claim 1, wherein the Encryption processor further comprises:
 an input key terminal for receiving an input key;
 a first Exclusive or (XOR) unit having a first input coupled to the input terminal of the Encryption processor and a second input coupled to the second input key terminal of the Encryption processor;
 a second XOR unit having a first input coupled to the output of the MixColumns unit, a second input coupled to the output of the output terminal of the key expansion unit;
 a first multiplexer having a first input coupled to an output of the first XOR unit and a second input coupled to an output of the second XOR unit and an output coupled to an input of the S-box unit, wherein an output of the S-box unit is coupled to the input terminal of the byte permutation unit.

5. The Encryption processor according to claim 4, wherein the Encryption processor further comprises:
 another data input terminal for receiving other input data;
 an input multiplexer for multiplexing the input data and other input data to obtain a multiplexed data signal to be supplied to the first input of the first XOR unit;
 a second byte permutation unit having an input coupled to the S-box;
 a second MixColumns unit coupled to the second byte permutation unit;
 an output multiplexer having an input coupled to the output of the MixColumns unit and an input coupled to the output of the second MixColumns unit, to obtain a combined signal to be supplied to the second XOR unit.

6. The Encryption processor according to claim 5, wherein the Encryption processor further comprises a clock gating circuit for generating for the byte permutation unit and the second byte permutation unit a first and second gated clock signal respectively.

7. The Encryption processor according to claim 4, wherein the Encryption processor further comprises:
 another data input terminal for receiving other input data;
 an input multiplexer for multiplexing the input data and other input data to obtain a multiplexed data signal to be supplied to the first input of the first XOR unit;
 a second byte permutation unit having an input coupled to the S-box and four outputs;
 wherein the MixColumns unit comprises four additional input terminals coupled to the four outputs of the second byte permutation unit, wherein the inputs of the rotator unit are coupled to the four input terminals and four additional input terminals of the MixColumns unit, wherein the rotator unit is arranged to receive alternating the bytes at the four input terminals and the four additional input terminals at the first frequency, to perform a cyclic shift on the combination of the four bytes at the input terminals and additional input terminals at a third frequency to supply sequentially four intermediate bytes to the four outputs of the rotator unit at the third frequency, wherein the third frequency is eight time the first frequency.

8. The Encryption processor according to claim 7, wherein the Encryption processor further comprises a clock gating circuit for generating for the byte permutation unit and the second byte permutation unit a first and second gated clock signal respectively.

9. The Encryption processor according to claim 1, further comprising a key expansion unit, wherein the key expansion unit comprises:
   a processing unit 700 having a first input coupled to an input terminal of the key expansion unit, a first output coupled to an output terminal of the key expansion unit; and
   a register bank 702 having an input coupled to a second output of the processing unit and an output coupled to a second input of the processing unit, wherein the register bank comprises:
   four units having a delay line of three delays, each unit having an input coupled to the input of the register bank, a clock signal input and an output;
      demultiplexer having four inputs, an output coupled to the output of the register bank and a control signal input, each input coupled to an output of the four units; and
   a control unit 712 for alternately supplying an active clock signal to one of the four units and generating a control signal to be supplied to the clock signal input of the demultiplexer.

10. The Encryption processor according to claim 1, further comprising a key expansion unit, wherein the key expansion unit comprises:
   a processing unit 700 having a first input coupled to an input terminal of the key expansion unit, a first output coupled to an output terminal of the key expansion unit; and
   a register bank 702 having an input coupled to a second output of the processing unit and an output coupled to a second input of the processing unit, wherein the register bank comprises:
   four units having a delay line of three delays, each unit having an input coupled to the input of the register bank, a clock signal input and an output;
      demultiplexer having four inputs, an output coupled to the output of the register bank and a control signal input, each input coupled to an output of the four units; and
   a control unit 712 for alternately supplying an active clock signal to one of the four units and generating a control signal to be supplied to the clock signal input of the demultiplexer.

11. The Encryption processor according to claim 1, further comprising a key expansion unit, wherein the key expansion unit comprises:
   a processing unit 700 having a first input coupled to an input terminal of the key expansion unit, a first output coupled to an output terminal of the key expansion unit; and
   a register bank 702 having an input coupled to a second output of the processing unit and an output coupled to a second input of the processing unit, wherein the register bank comprises:
   four units having a delay line of three delays, each unit having an input coupled to the input of the register bank, a clock signal input and an output;
      demultiplexer having four inputs, an output coupled to the output of the register bank and a control signal input, each input coupled to an output of the four units; and
   a control unit 712 for alternately supplying an active clock signal to one of the four units and generating a control signal to be supplied to the clock signal input of the demultiplexer.

12. The Encryption processor according to claim 1, further comprising a key expansion unit, wherein the key expansion unit comprises:
   a processing unit 700 having a first input coupled to an input terminal of the key expansion unit, a first output coupled to an output terminal of the key expansion unit; and
   a register bank 702 having an input coupled to a second output of the processing unit and an output coupled to a second input of the processing unit, wherein the register bank comprises:
   four units having a delay line of three delays, each unit having an input coupled to the input of the register bank, a clock signal input and an output;
      demultiplexer having four inputs, an output coupled to the output of the register bank and a control signal input, each input coupled to an output of the four units; and
   a control unit 712 for alternately supplying an active clock signal to one of the four units and generating a control signal to be supplied to the clock signal input of the demultiplexer.

* * * * *